(12) United States Patent
Yoon et al.

(10) Patent No.: US 12,248,629 B2
(45) Date of Patent: Mar. 11, 2025

(54) STATIC AND DYNAMIC INPUT MULTIPLEXING FOR HIGH-DENSITY NEURAL SIGNAL RECORDING

(71) Applicant: Neuralink Corp., Fremont, CA (US)

(72) Inventors: Do Yeon Yoon, Sunnyvale, CA (US); Dongjin Seo, Mountain View, CA (US); SungWon Chung, Fremont, CA (US)

(73) Assignee: Neuralink Corp., Fremont, CA (US)

( * ) Notice: Subject to any disclaimer, the term of this patent is extended or adjusted under 35 U.S.C. 154(b) by 428 days.

(21) Appl. No.: 17/682,334

(22) Filed: Feb. 28, 2022

(65) Prior Publication Data

US 2023/0273681 A1 Aug. 31, 2023

(51) Int. Cl.
*G06F 3/01* (2006.01)
*H04Q 11/00* (2006.01)

(52) U.S. Cl.
CPC .............. *G06F 3/015* (2013.01); *H04Q 11/00* (2013.01); *H04Q 2213/13343* (2013.01)

(58) Field of Classification Search
CPC .................... G06F 3/015; H04Q 11/00; H04Q 2213/13343; H04Q 2213/13292; H04Q 3/64; H04Q 3/54; A61B 5/24; A61B 5/6868; A61B 5/30; A61B 5/25; A61B 5/2415; A61B 5/242
See application file for complete search history.

(56) References Cited

U.S. PATENT DOCUMENTS

| | | | |
|---|---|---|---|
| 2005/0090756 A1* | 4/2005 | Wolf | A61B 5/30 607/48 |
| 2008/0146960 A1 | 6/2008 | Irazoqui-pastor et al. | |
| 2012/0172682 A1* | 7/2012 | Linderman | A61B 5/389 600/300 |
| 2016/0323000 A1* | 11/2016 | Liu | H04W 4/80 |
| 2019/0286592 A1 | 9/2019 | Seo et al. | |
| 2019/0369726 A1* | 12/2019 | Kang | A61B 5/389 |
| 2021/0012909 A1* | 1/2021 | Koh | G16H 40/63 |

OTHER PUBLICATIONS

PCT/US2023/013288, International Search Report and Written Opinion published May 25, 2023, 9 pages.

* cited by examiner

*Primary Examiner* — Xuemei Zheng
(74) *Attorney, Agent, or Firm* — Oblon, McClelland, Maier & Neustadt, L.L.P.

(57) ABSTRACT

Techniques for static and dynamic input multiplexing for high-density neural signal recording are disclosed herein. A multiplexer can receive a first set of neural signals via inputs. A subset of the first set of neural signals above a threshold can be determined. A group of the inputs corresponding to the subset of the first set of neural signals can be determined. Operation of the multiplexer can be modified to block inputs not in the identified group of the inputs. A second set of neural signals can be received into the multiplexer via the group of the inputs. The second set of neural signals can be transmitted to a plurality of channels of an amplifier while blocking inputs not in the identified group of the inputs. The second set of neural signals can be amplified using the amplifier. The amplified second set of neural signals can be transmitted for further processing.

20 Claims, 6 Drawing Sheets

FIG. 4

STATIC AND DYNAMIC INPUT MULTIPLEXING FOR HIGH-DENSITY NEURAL SIGNAL RECORDING

CROSS-REFERENCES TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

BACKGROUND

Implantable devices are used for a variety of applications such as cardiac pacemakers, cochlear implants, and recording and stimulating electrical signals in target biological tissue. In many cases, active electronic devices are critical to the functionality of the implantable device. As implantable devices advance, it is increasingly common to have a large number of wires extending from the implantable device. For example, a brain-machine interface includes thousands of wires extending from an implantable device and implanted in a brain. Body environments such as brain tissue, heart tissue, and the like have high humidity and bodily fluids. Implantable devices are generally in an in-vivo environment including high humidity and oxidative inflammatory response that will put stress on sensitive components such as active electronics without proper protection.

To accurately record electrical signals, it may be advantageous for the implantable device to have a large number of wires implanted in the brain. But, the number of wires may be limited due to a size of an integrated circuit chip that receives and processes the electrical signals from the wires. Additionally, increasing the number of wires may increase power consumption by the integrated circuit during the reception and processing of the electrical signals.

BRIEF SUMMARY OF THE INVENTION

Some embodiments of the present disclosure are related to a method for static and dynamic input multiplexing for high-density neural signal recording. The method includes receiving, into a multiplexer, a first set of neural signals via a plurality of inputs, determining that a subset of the first set of neural signals is above a threshold, identifying a group of the plurality of inputs corresponding to the subset of the first set of neural signals, modifying operation of the multiplexer to block inputs not in the identified group of the plurality of inputs, receiving, into the multiplexer, a second set of neural signals via the group of the plurality of inputs, transmitting the second set of neural signals to a plurality of channels of an amplifier while blocking inputs not in the identified group of the plurality of inputs, amplifying the second set of neural signals using the amplifier, and transmitting the amplified second set of neural signals for further processing.

Receiving the first set of neural signals can include switching on, in turn, a path to each input of the plurality of inputs and sampling each input at a different target sampling frequency.

The multiplexer can include a number N of switches. Switching on each input path can include activating a respective switch of the N switches. Each switch can be activated at N times the target sampling frequency.

Transmitting the first set of neural signals can be performed in a first mode. The first mode can be activated via a first control signal by a decoder of the multiplexer. Transmitting the second set of neural signals can be performed in a second mode. The second mode can be activated via a second control signal of the decoder.

The amplifier can be a first amplifier. Transmitting the second set of neural signals for further processing includes transmitting the amplified second set of neural signals to a band-pass filter to generate a filtered set of neural signals and transmitting the filtered set of neural signals to a second amplifier.

The first set of neural signals is received via a plurality of input multiplexers. The plurality of input multiplexers transmit the second set of neural signals to a plurality of amplifiers. Transmitting the amplified second set of neural signals for further processing includes transmitting the amplified second set of neural signals to an analog multiplexer via the plurality of amplifiers.

The method can further include transmitting output of the analog multiplexer to an analog-to-digital converter.

Neural signals above the threshold can correspond to neural spikes.

The multiplexer and the amplifier can be included in an integrated circuit. Transmitting the second set of neural signals for further processing can include transmitting the second set of neural signals off of the integrated circuit.

The second set of neural signals can be transmitted off of the integrated circuit via a short-range wireless communication.

The identified group of the plurality of inputs can be a first subset of the plurality of inputs. The method can further include receiving, into the multiplexer, a third set of neural signals via the plurality of inputs, determining that a subset of the third set of neural signals is above the threshold, and identifying a second group of the plurality of inputs corresponding to the subset of the third set of neural signals. The second group of the plurality of inputs can be different from the first group of the plurality of inputs. The method can further include modifying operation of the multiplexer to block inputs not in the identified second group of the plurality of inputs, receiving a fourth set of neural signals via the second group of the plurality of inputs, transmitting the fourth set of neural signals to a plurality of channels of an amplifier while blocking the inputs not in the identified second group of the plurality of inputs, amplifying the fourth set of neural signals using the amplifier, and transmitting the amplified fourth set of neural signals for further processing.

Some embodiments of the present disclosure are related to a system for static and dynamic input multiplexing for high-density neural signal recording. The system includes a plurality of electrodes implanted in a brain and coupled to a multiplexer via a respective plurality of inputs. The multiplexer is configured to receive a first set of neural signals via the plurality of inputs, identify a group of the plurality of inputs corresponding to a subset of the first set of neural signals above a threshold, modify operation of the multiplexer to block inputs not in the identified group of the plurality of inputs, receive a second set of neural signals via the group of the plurality of inputs, and transmit the second set of neural signals to a plurality of channels of an amplifier while blocking inputs not in the identified group of the plurality of inputs. The amplifier amplifies the second set of neural signals and transmits the amplified second set of neural signals for further processing.

The multiplexer and the amplifier can be included in an integrated circuit.

A short-range wireless transmitter can be configured to transmit the second set of neural signals off of the integrated circuit.

The amplifier can be a first amplifier and the multiplexer can be further configured to transmit the amplified second set of neural signals to a band-pass filter. The system can further include the band-pass filter configured to generate a filtered set of neural signals and transmit the filtered set of neural signals to a second amplifier and the second amplifier configured to amplify the filtered set of neural signals.

The system can further include a plurality of input multiplexers including the multiplexer. The first set of neural signals can be received via the plurality of input multiplexers and the plurality of input multiplexers can transmit the second set of neural signals to a plurality of amplifiers. The plurality of amplifiers can include the amplifier, and transmitting the amplified second set of neural signals for further processing can involve transmitting the amplified second set of neural signals to an analog multiplexer via the plurality of amplifiers.

The neural signals above the threshold correspond to neural spikes.

Transmitting the first set of neural signals can include switching on, in turn, a path to each input of the plurality of inputs and sampling each input at a target sampling frequency.

The multiplexer can include a number N of switches and switching on each input path can involve activating a respective switch of the N switches. Each switch is activated at N times the target sampling frequency.

The identified group of the plurality of inputs can be a first group of the plurality of inputs. The multiplexer can be further configured to receive a third set of neural signals via the plurality of inputs and identify a second group of the plurality of inputs corresponding to a subset of the third set of neural signals above the threshold. The second group of the plurality of inputs is different from the first group of the plurality of inputs. The multiplexer can be configured to modify operation of the multiplexer to block inputs not in the identified second group of the plurality of inputs, receive a fourth set of neural signals via the second group of the plurality of inputs, and transmit the fourth set of neural signals to the amplifier while blocking inputs not in the identified second group of the plurality of inputs. The amplifier can be further configured to amplify the fourth set of neural signals and transmit the amplified fourth set of neural signals for further processing.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

DETAILED DESCRIPTION OF THE INVENTION

The present disclosure relates to systems and methods for static and dynamic input multiplexing for high-density neural signal recording. An implantable device can include an integrated circuit with an input multiplexer that can be in communication with multiple wires, or electrodes, that each receive neural signals. For example, an input multiplexer can be in communication with eight input wires. The input multiplexer can also be in communication with an analog pixel of the integrated circuit that includes an amplifier for amplifying the neural signals received by the input multiplexer through the input wires. This configuration allows one analog pixel to be used for multiple input wires, preventing the integrated circuit from having an analog pixel for each of the input wires. The use of the input multiplexer can thus allow the number of input wires to be large without increasing a size of the integrated circuit.

As noted above, conventional implantable devices suffer from several limitations. Implantable devices traditionally include each input wire connected to an analog pixel of an integrated circuit. For a small number of input wires, this configuration is generally well-suited, as the integrated circuit can fit an analog pixel for each input wire. However, as implantable devices evolve, so do the needs for the integrated circuit. In particular, devices are increasingly developed with large numbers of input wires extending into tissue. For example, a brain-machine interface (BMI) uses multiple electrodes to stimulate brain tissue and record neurological signals. BMIs have the potential to help people with a wide range of clinical disorders, and have been applied in contexts such as neuroprosthetic control of computer cursors, robotic limbs, and speech synthesizers. Development of BMIs has been limited historically by an inability to record from large numbers of neurons. Due to recent developments in electrode fabrication, robotic insertion, electronic design, and signal processing, there is now the ability to implant a BMI with thousands of electrodes. This new generation of BMIs can include thousands of wires spaced relatively closely together (e.g., micron-level spacing) and connected to sensitive electronics. However, this means that traditional analog pixel approaches are no longer feasible. Integrated circuits may not be able to remain a desired size and fit an analog pixel for each of the thousands of electrodes.

While the brain includes billions of neurons, only a portion of the neurons may fire at a given time, and thus only a portion of the input wires may receive signals. The portion of neurons that fire may change over time, for example based on a task being performed, so it may be desirable for each of the input wires to be capable of receiving neurological signals when neurons associated with the input wire are active. But, continuously recording signals from all of the input wires may increase power consumption and heat production of the implantable device. Increased power consumption can also result in a shorter lifetime for the implantable device.

Techniques described herein address these issues. An input multiplexer is connected to a set of wires and an analog pixel. The input multiplexer periodically determines a subset of wires that receive neural signals that are above a threshold. The input multiplexer can then receive neural signals only from the wires in the subset and block neural signals not in the subset. Using the input multiplexer can allow the number of wires to increase without the size of the integrated circuit increasing. Additionally, blocking neural signals from wires that are not in the subset of wires can reduce power consumption of the implantable device.

Many of the details, dimensions, angles and other features shown in the Figures are merely illustrative of particular embodiments. Accordingly, other embodiments can include other details, dimensions, angles, and features without departing from the spirit or scope of the present invention. Various embodiments of the present technology can also include structures other than those shown in the Figures and are expressly not limited to the structures shown in the Figures. Moreover, the various elements and features shown in the Figures may not be drawn to scale. In the Figures, identical reference numbers identify identical or at least generally similar elements.

Figure 1A:
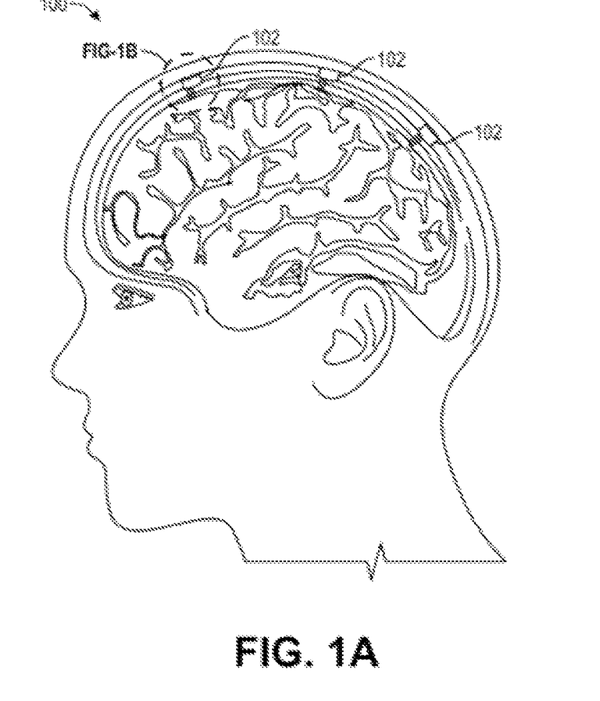
FIG. 1A is an illustrative side view of a human head with brain-machine interface (BMI) implants with hermetically sealed feedthroughs in accordance with an embodiment.

FIG. 1A illustrates a human head with system 100 of three brain-machine interface (BMI) implants 102 set within holes in the subject's cranium (skull bone). They are located in different lobes, or areas of the brain, to capture or stimulate targeted sections. The holes, called "burr holes," are about 8 millimeters in diameter and drilled using specialized surgical tools. During surgery, thin film electrodes, sometimes numbering in the hundreds or thousands, are delicately inserted into the cortex at precise locations to avoid vasculature. The thin film electrodes merge into ribbon cable 104 at one end, which in turn is preconnected to the implant 102. Each implant 102 is carefully set on top of the ribbon cable 104 to cover the burr hole.

Figure 1B:
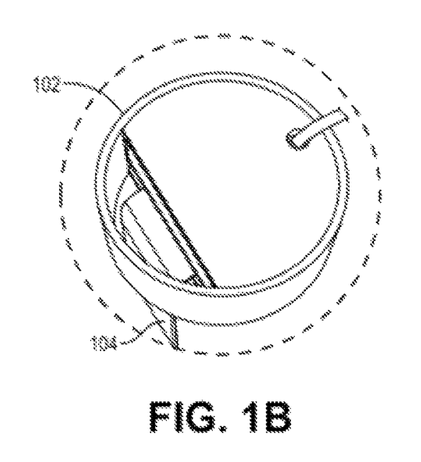
FIG. 1B is a perspective top view of an implant of FIG. 1A.
Figure 1C:
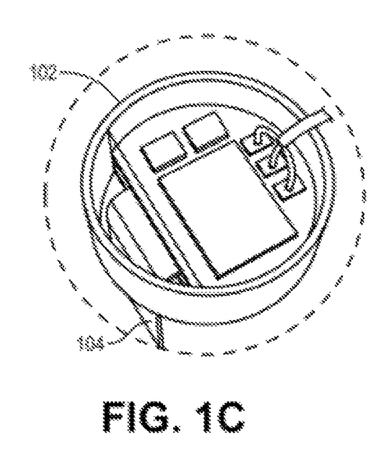
FIG. 1C is a perspective top view of the implant of FIG. 1B with its cover removed.

FIGS. 1B-1C show an implant 102 with a ribbon cable 104 extending below it. FIG. 1C shows the implant without its top cover. Within each implant 102 is circuitry, including integrated circuit (IC) chips, capacitors, and other components. The ICs receive from, and/or transmit to, the thin film electrodes that are surgically implanted within the subject's cranium. The ICs can include analog-to-digital converters (ADC) and/or digital-to-analog converters (DAC) in order to convert analog signals in the brain to or from digital signals of a computer.

Sitting in the burr hole, the bottom of each implant 102, and the entire implant 102, are awash with cerebrospinal fluid (CSF) and other body fluids. These fluids are corrosive to the silicon in the IC chips as well as other circuit components and must be sealed away from them. Therefore, the components are isolated within the implant 102 in a hermetic (e.g., mostly-glass) container that is biologically neutral. The components are carefully positioned to interface with the thin film ribbon cable 104 of what may be thousands of individual electrodes.

Figure 2A:
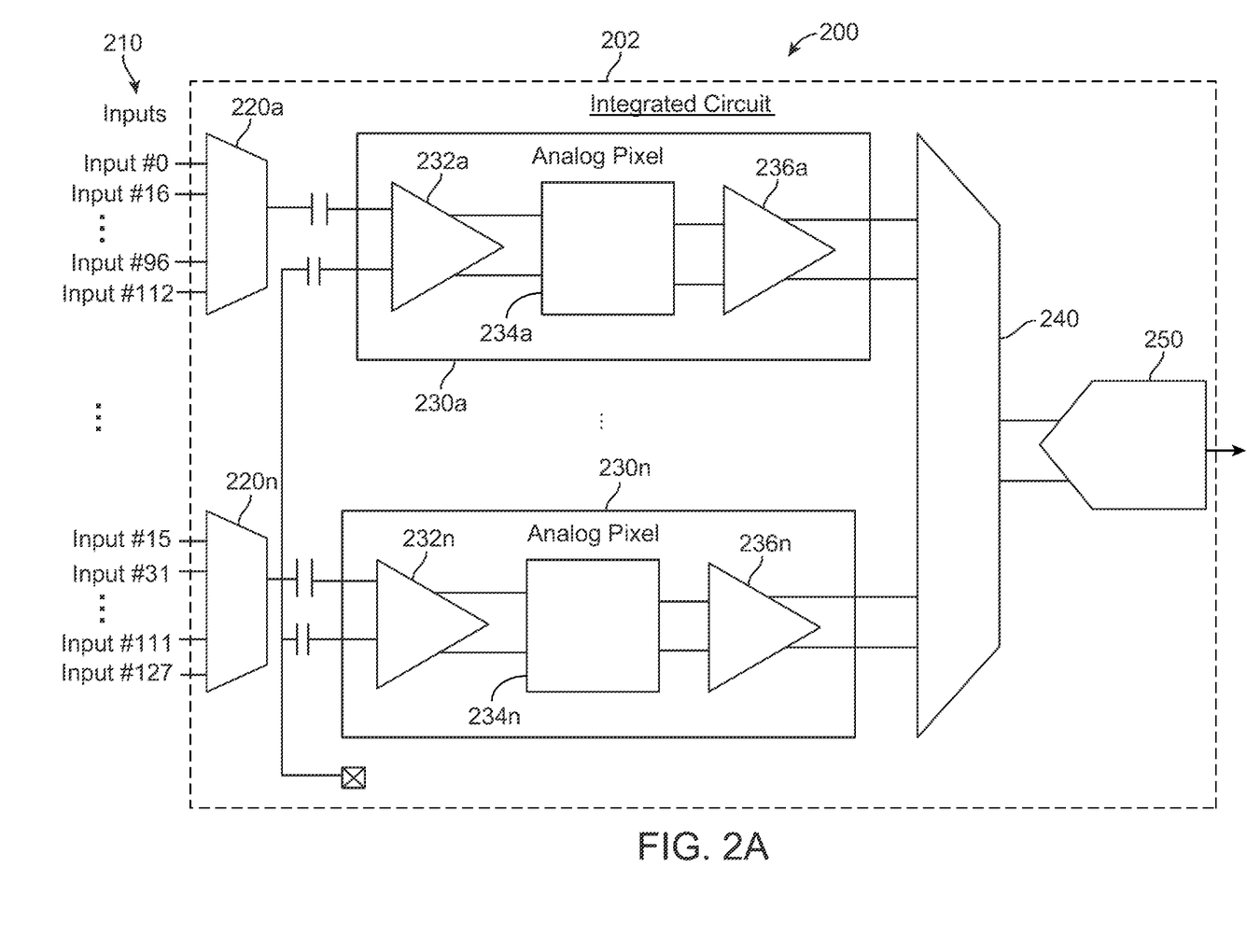
FIG. 2A illustrates components of a system for static and dynamic input multiplexing for high-density neural signal recording, according to an aspect of the present disclosure.

FIG. 2A illustrates components of a system 200 for static and dynamic input multiplexing for high-density neural signal recording, according to an aspect of the present disclosure. The system 200 can correspond to the implant 102 in FIGS. 1A-1C. The system 200 can include inputs 210 and an integrated circuit 202. The integrated circuit 202 can include one or more input multiplexers 220a-n that each are each in communication with a set of the inputs 210. The integrated circuit 202 can also include one or more analog pixels 230a-n that are each in communication with a respective multiplexer of the input multiplexers 220a-n. Each of the analog pixels 230a-n can include respective first amplifiers 232a-n, such as low-noise amplifiers, band-pass filters 234a-n, and second amplifiers 236a-n, such as variable-gain amplifiers, for amplifying and filtering an input neural signal. In addition, the integrated circuit 202 can include an analog multiplexer 240 in communication with the analog pixels 230a-n and an analog-to-digital converter 250.

The integrated circuit 202 can receive and transmit neural signals (e.g., that may originate from the brain or other suitable component of the system 200). The integrated circuit 202 may receive the neural signals using the inputs 210 included in or otherwise coupled to the integrated circuit 202. Each of the inputs 210 can be an electrode of the implant 102. The system 200 can be implanted in an entity, such as a human, a non-human primate, an invertebrate, a mammal, or any other suitable organism or entity that can receive the system 200. For example, the entity can include a brain or similar organ that may generate, broadcast, or otherwise include neural signals that can be detected by the integrated circuit 202. The system 200 is shown as including 128 inputs, but other examples may include 256 inputs, 512 inputs, 1024 inputs, 2048 inputs, or any other suitable amount of inputs that can receive and transmit neural signals.

Each of the inputs 210 are in communication with an input multiplexer of the input multiplexers 220a-n. Each of the input multiplexers 220a-n can receive neural signals from a set of the inputs 210. For example, there can be 16 input multiplexers and 128 inputs. Each of the input multiplexers 220a-n can receive neural signals from 8 of the inputs 210. The input multiplexer 220a is shown as receiving neural signals from input #0, input #16, input #32, input #48, input #64, input #80, input #96, and input #112. Additionally, the input multiplexer 220n is shown as receiving neural signals from input #15, input #31, input #47, input #63, input #79, input #95, input #11, and input #127. In other examples, each of the input multiplexers 220a-n may receive up to 32 of the inputs 210. The input multiplexers 220a-n can have a sampling frequency of the number of inputs for each input multiplexer times a target sampling frequency (e.g., 20 kHz). For example, since each of the input multiplexers 220a-n in FIG. 2A is connected to 8 inputs, the input multiplexers 220a-n can have a sampling frequency of 8 times the target sampling frequency.

The neural signals received by the 8 inputs that are received by each of the input multiplexers 220a-n can be referred to as a first set of neural signals. In a first mode of the input multiplexers 220a-n, which can be a dynamic mode, the first set of neural signals can be transmitted to the input multiplexers 220a-n, which is further described in FIG. 3. The system 200 can determine that a subset of the first set of neural signals is above a threshold. For example, the system 200 can determine that one or more of the neural signals is a neural spike. Neural spikes are associated with a characteristic change in sample amplitude over time. The sample amplitude may, for example, represent voltage, power, or frequency. As a specific example, the threshold can be a change in a sample amplitude of voltage of 30 millivolts (mV). Determining whether a neural signal corresponds to a neural spike may involve filtering the neural signal, fitting the filtered signal to a model, identifying a set of fit values (e.g., sample amplitude values and time values) based on the model, computing a set of characteristic values (e.g., time elapsed between a local maximum and a local minimum in the voltage of the signal over time) based on the fit values, comparing the set of characteristic values to a corresponding set of threshold values, and determining whether the comparison indicates a neural spike. For example, if a first characteristic value exceeds a first threshold value and a second characteristic value is below a second threshold, then it can be determined that a detected signal is likely associated with a neural spike.

Figure 2B:
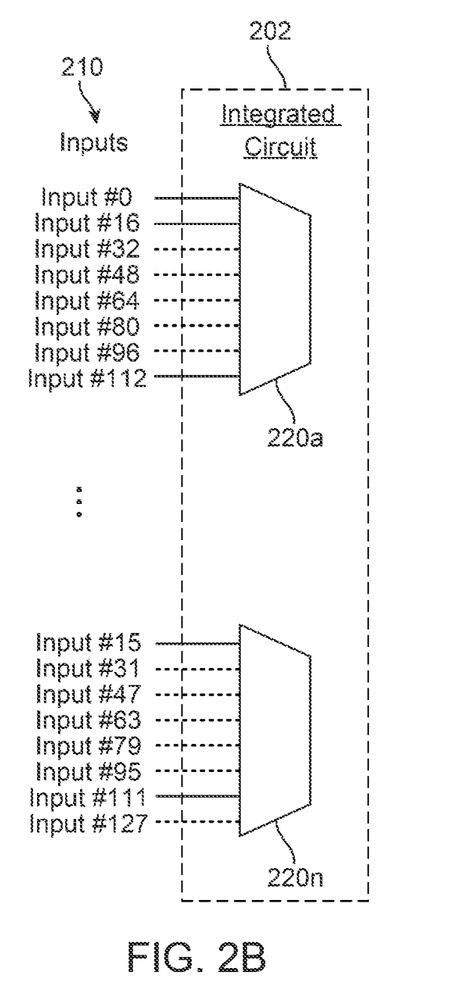
FIG. 2B illustrates an example of an identified group of inputs for an input multiplexer of FIG. 2A, according to an aspect of the present disclosure.

The input multiplexers 220a-n can then identify a group of the inputs 210 that correspond to the subset of the first set of neural signals. A group of the inputs 210 can be identified for each of the input multiplexers 220a. As illustrated in FIG. 2B, for the input multiplexer 220a, neural signals received by input #0, input #16, and input #112 can be determined to be above the threshold, so input #0, input #16, and input #112 can be identified as the group of inputs that corresponds to the subset of the first set of neural signals, as indicated by the solid lines. Input #32, input #48, input #64, input #80, and input #96 can be excluded from the group of inputs, as indicated by the dashed lines. Additionally, for the input multiplexer 220n, neural signals received by input #15 and input #111 can be determined to be above the threshold, so input #15 and input #111 can be identified as the group of inputs that corresponds to the subset of the first set of neural signals, as indicated by the solid lines. Input #31, input #47, input #63, input #79, input #95, and input #127 can be excluded from the group of inputs, as indicated by the dashed lines.

Returning to FIG. 2A, the operation of the input multiplexers 220a-n can then be modified to block inputs not in the identified group of inputs. For example, the input multiplexers 220a-n can include switches for each of the inputs 210, and only switches corresponding to inputs of the identified group of inputs can be activated. Continuing the example for the input multiplexer 220a, input #32, input #48, input #64, input #80, and input #96 can be blocked. The input multiplexers 220a-n can then receive a second set of neural signals via their respective groups of inputs. For the input multiplexer 220a, the second set of neural signals can be received from input #0, input #16, and input #112. Blocking the inputs not in the identified group of inputs can reduce a power consumption of the integrated circuit 202.

The input multiplexers 220a-n can transmit the second set of neural signals to corresponding first amplifiers 232a-n, which can be a part of corresponding analog pixels 230a-n. The first amplifiers 232a-n can be low-noise amplifiers. For example, input multiplexer 220a can be in communication with first amplifier 232a of analog pixel 230a, and input multiplexer 220n can be in communication with first amplifier 232n of analog pixel 230n. The input multiplexers 220a-n can transmit the second set of neural signals in a second mode, which can be a static mode and is further described in FIGS. 3A-3C. Inputs not in the identified group of inputs can be blocked from being transmitted to the analog pixels 230a-n. The first amplifiers 232a-n can amplify the second set of neural signals and transmit the amplified second set of neural signals for further processing. The input multiplexers 220a-n allow each of the analog pixels 230a-n to have multiple inputs. Since one analog pixel receives multiple input signals through an input multiplexer, the effective area per input of the integrated circuit 202 can be reduced based on the number of inputs connected to one input multiplexer.

In some examples, the analog pixels 230a-n can include band-pass filters 234a-n and second amplifiers 236a-n, which can be variable-gain amplifiers. Transmitting the amplified second set of neural signals for further processing can include the first amplifiers 232a-n transmitting the amplified second set of neural signals to the band-pass filters 234a-n to generate filtered sets of neural signals. The band-pass filters 234a-n can then transmit the filtered sets of neural signals to the second amplifiers 236a-n that can amplify the filtered sets of neural signals.

Transmitting the amplified second set of neural signals for further processing may include transmitting the amplified second set of neural signals to an analog multiplexer 240. The first amplifiers 232a-n or the second amplifiers 236a-n can transmit the amplified second set of neural signals to the analog multiplexer 240. With 16 input multiplexers 220a-n and analog pixels 230a-n, the analog multiplexer 240 can be a 16:1 analog multiplexer. The analog multiplexer 240 can select one of 16 analog pixels 230a-n and connect the selected analog pixel to an analog-to-digital converter 250 to sample the neural signal from the selected analog pixel. The analog multiplexer 240 can rotate the selected analog pixel at 16 times the sampling frequency of the input multiplexers 220a-n. Thus, the analog-to-digital converter 250 can sample the neural signals from all active inputs at the target sampling frequency. For example, when the input multiplexers 220a-n uses the first mode to receive the first set of neural signals via all of the inputs 210, the analog-to-digital converter 250 samples all 128 of the inputs 210 from input #0 to input #127 at the target sampling frequency.

Transmitting the amplified second set of neural signals for further processing may additionally or alternatively include transmitting the second set of neural signals off of the integrated circuit 202. For example, the second set of neural signals can be transmitted off of the integrated circuit 202 via a short-range wireless communication, such as by a short-range wireless transmitter (not shown).

Figure 2C:
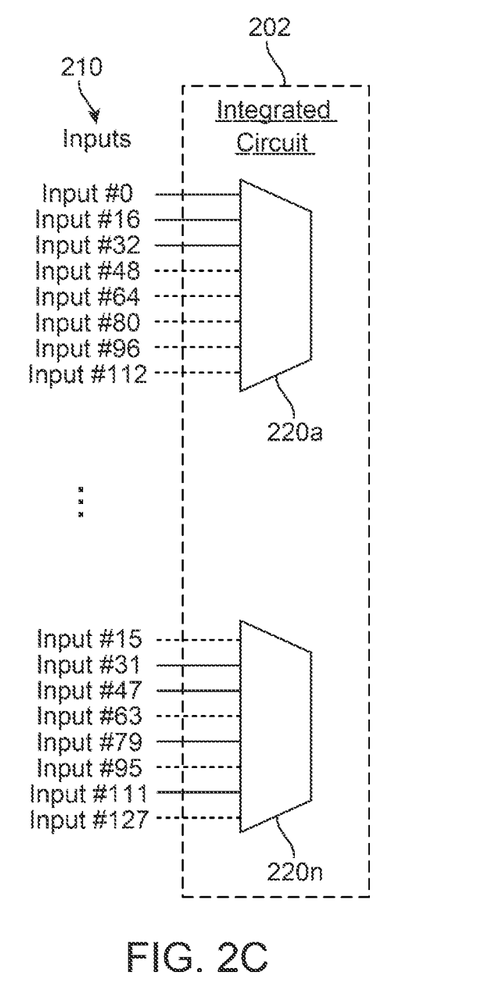
FIG. 2C illustrates another example of an identified group of inputs for an input multiplexer of FIG. 2A, according to an aspect of the present disclosure.

Since neural signal activity can change over time, the input multiplexers 220a-n can periodically re-enter the first, dynamic mode to receive a third set of neural signals from each of the inputs 210 and determine which of the inputs 210 receive neural signals above the threshold. For example, every 24 hours, every week, every month, or any other suitable time period or trigger may be used as the interval for the input multiplexers 220a-n being in the first mode. The group of inputs of the inputs 210 that are determined to correspond to neural signals above the threshold may change each time the input multiplexers 220a-n enter the first mode. Referring to FIG. 2C, after re-entering the first mode and receiving the third set of neural signals, it may be determined that instead of input #0, input #16, and input #112 of the input multiplexer 220a corresponding to neural signals above the threshold, now input #0, input #16, and input #32 correspond to neural signals above the threshold. Additionally, it can be determined that instead of input #15 and input #111 of the input multiplexer 220n corresponding to neural signals above the threshold, now input #31, input #47, input #79, and input #111 correspond to neural signals above the threshold. Operation of the input multiplexers 220a-n be modified to block inputs not in the new groups of inputs such that a fourth set of neural signals from the inputs in the new group of inputs can be received, transmitted to the first amplifiers 232a-n for amplification, and then transmitted for further processing.

Figure 3A:
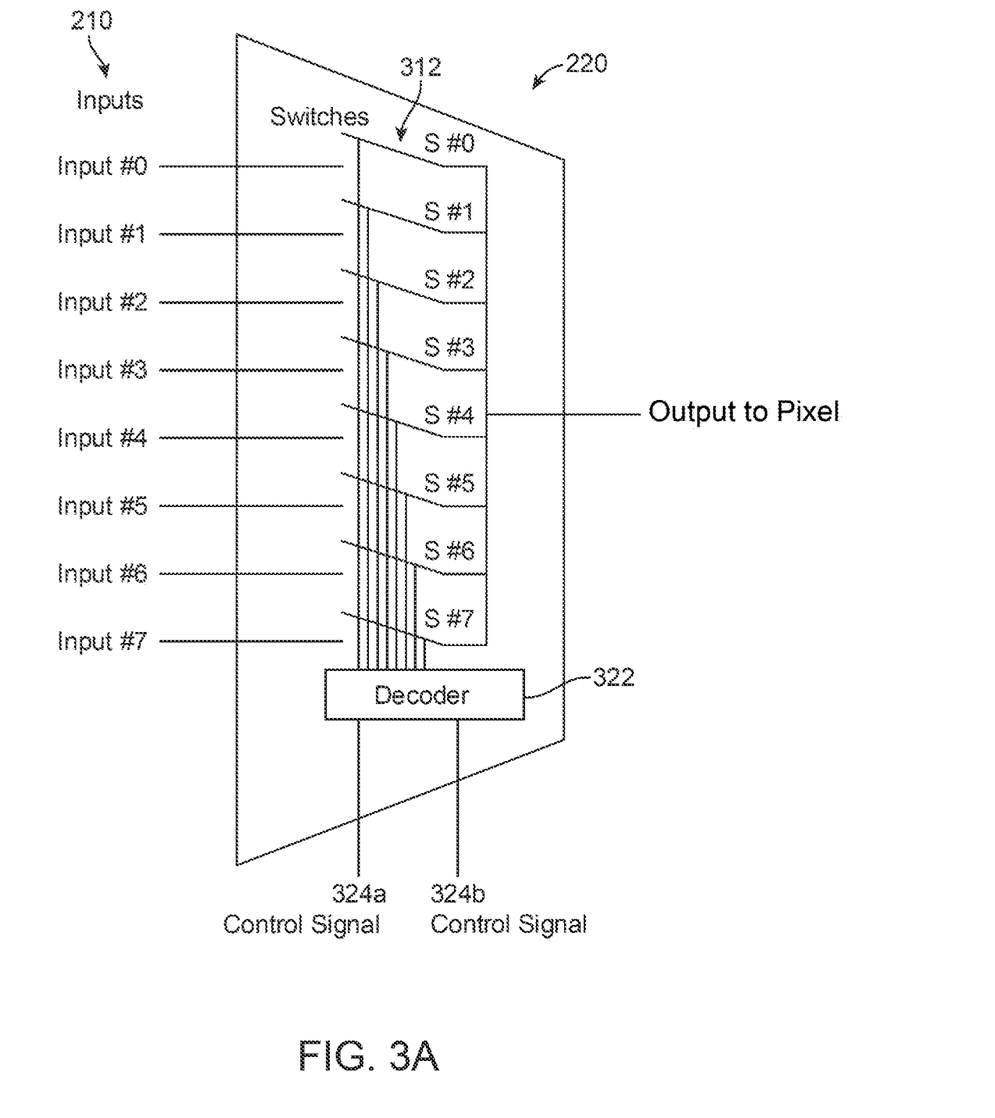
FIG. 3A illustrates a schematic of an input multiplexer of FIG. 2A, according to an aspect of the present disclosure.

FIG. 3 illustrates a schematic of an input multiplexer 220 of FIG. 2, according to an aspect of the present disclosure. The input multiplexer 220 is illustrated as an 8:1 input multiplexer, so the input multiplexer receives 8 inputs. The input multiplexer 220 also includes 8 switches, and each of the switches 312 is connected to one input. As illustrated, input #0 is connected to switch #0, input #1 is connected to switch #1, input #2 is connected to switch #2, input #3 is connected to switch #3, input #4 is connected to switch #4, input #5 is connected to switch #5, input #6 is connected to switch #6, and input #7 is connected to switch #7. In other examples, the input multiplexer 220 can have a different number of inputs and the input multiplexer 220 can have a number N of switches, where the number N of switches equals the number of inputs.

The input multiplexer 220 includes a decoder 322 that controls which of the switches 312 are turned on and turned off. The decoder 322 can activate the switches 312 via control signals. In a first mode, a first control signal 324a can be dynamic and used to transmit a first set of neural signals from each of the inputs 210. The first control signal 324a can switch on, in turn, a path to each of the inputs 210. For example, switching on the path can include activating a respective switch of the switches 312. To illustrate, activating an input path for input #0 can involve activating switch #0. The input multiplexer 220 can sample each input at a target sampling frequency. Each switch can be activated at N times the target sampling frequency. In FIG. 3A, since N is 8, each of the switches 312 can be activated at 8 times the target sampling frequency. With respect to the analog pixel 230a in FIG. 2A that is connected to the input multiplexer 220a, the analog pixel 230a rotates the selected input from input #0 to input #112, and only one input is connected to the analog pixel 230a in the dynamic mode.

Figure 3B:
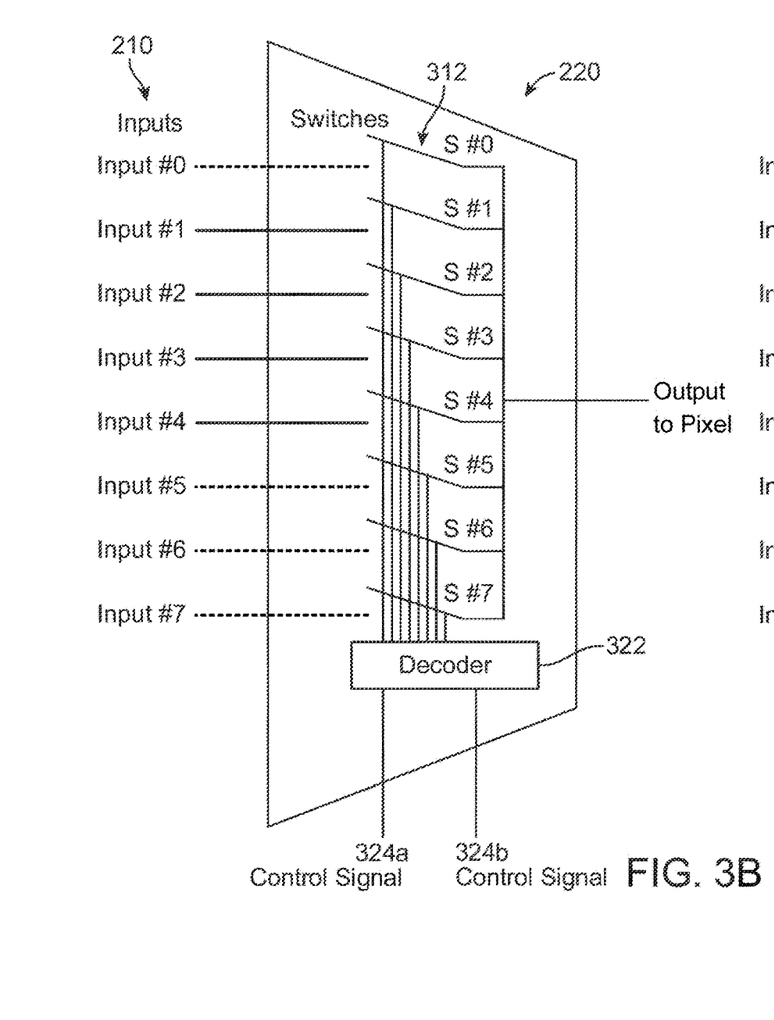
FIG. 3B illustrates an example of an identified group of inputs for an input multiplexer of FIG. 3A, according to an aspect of the present disclosure.

In a second, static mode, a second control signal 324b can be used to transmit a second set of neural signals from a group of the inputs 210. For example, the one or more of the inputs 210 can be inputs identified to correspond to a subset of the first set of neural signals above a threshold. As illustrated in FIG. 3B, while in the first mode, it can be determined that input #1 through input #4 correspond to neural signals above the threshold. Input #1 through input #4 can thus correspond to the group of the inputs 210, as indicated by the solid lines. The second control signal 324b of the decoder 322 can activate the switches 312 of each of the inputs of the group of the inputs 210 to receive the second set of neural signals. The input multiplexer 220 can then transmit the second set of neural signals to an amplifier and other components for further processing, as described in FIG. 2A. The configuration can remain constant until a different static control signal is received.

Figure 3C:
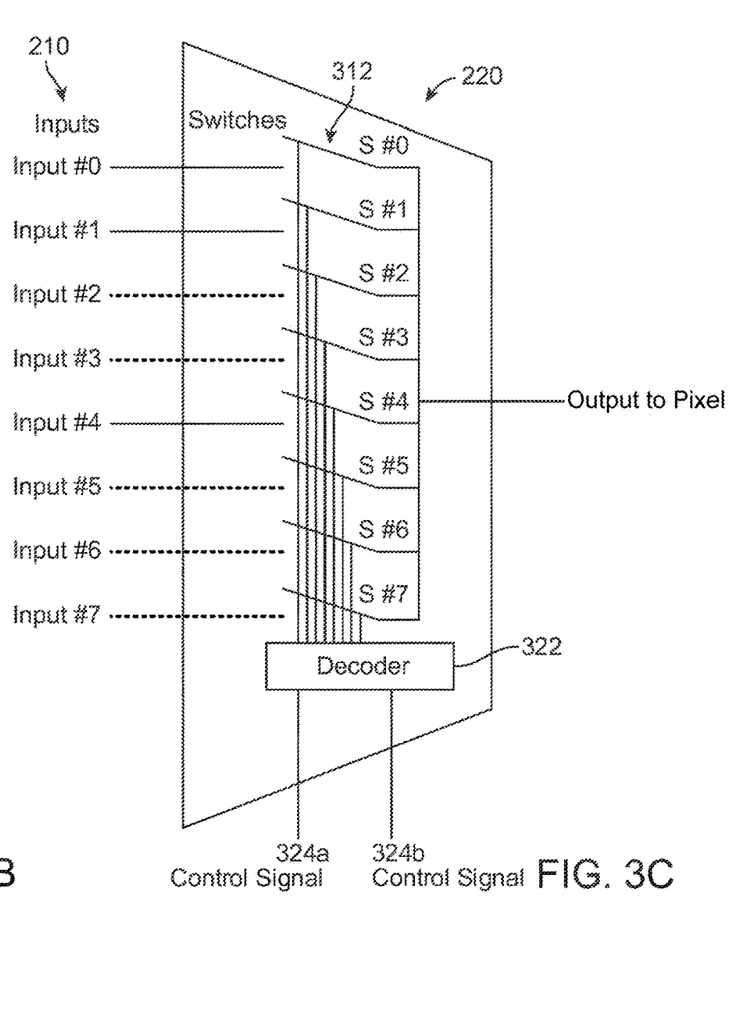
FIG. 3C illustrates another example of an identified group of inputs for an input multiplexer of FIG. 3A, according to an aspect of the present disclosure.

Also, as previously described, the input multiplexer 220 can periodically re-enter the first mode to receive a third set of neural signals from each of the inputs 210 and determine which of the inputs 210 receive neural signals above the threshold. The group of inputs of the inputs 210 that are determined to correspond to neural signals above the threshold may change each time the input multiplexer 220 enters the first mode. Referring to FIG. 3C, after re-entering the first mode and receiving the third set of neural signals, it may be determined that instead of input #1 through input #4 of the input multiplexer 220 corresponding to neural signals above the threshold, now input #0, input #1, and input #4 correspond to neural signals above the threshold. The second control signal 324b of the decoder 322 can activate the switches 312 of each of the inputs of the new group of the inputs 210 to receive the second set of neural signals. The input multiplexer 220 can then transmit the second set of neural signals to an amplifier and other components for further processing.

Figure 4:
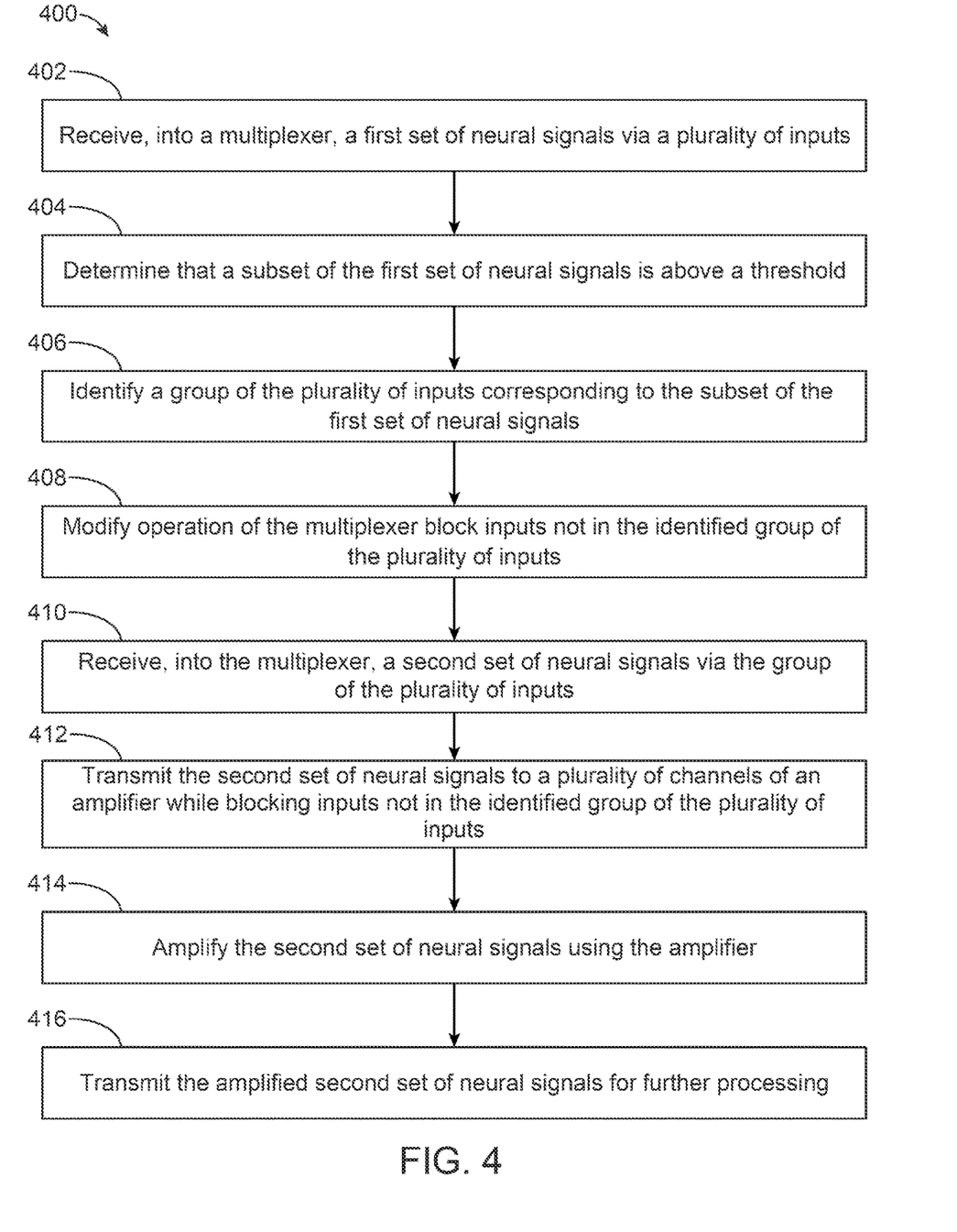
FIG. 4 is an example flowchart describing a method of static and dynamic input multiplexing for high-density neural signal recording, according to aspects of the present disclosure.

FIG. 4 is an example flowchart describing a method 400 of static and dynamic input multiplexing for high-density neural signal recording, according to aspects of the present disclosure. One or more operations of the method 400 can be performed by the system 200, any component thereof, or any other suitable device (e.g., computing device) suitably coupled to the system 200. The system 200 may be or otherwise include an integrated circuit that can be communicatively coupled to inputs that can be implanted in (or otherwise suitably coupled to) a brain (or other suitable component).

In operation 402 a multiplexer can receive a first set of neural signals via a plurality of inputs. The multiplexer can be an input multiplexer, such as input multiplexer 220 in FIGS. 3A-3C, and the inputs can be the inputs 210 in FIGS. 2-3C. The inputs 210 can be electrodes that can be included in, or otherwise (e.g., communicatively or electrically) coupled to, the system 200. In some examples, the inputs 210 can detect neural signals (e.g., spikes) from an entity or any component thereof such as a brain of the entity. The inputs 210 may detect or otherwise receive the first set of neural signals and may transmit the first set of neural signals to the input multiplexer 220 for processing. A first control signal of a decoder of the input multiplexer 220 can switch on, in turn, a path to each input of the plurality of inputs and each input can be sampled at a target sampling frequency.

In operation 404, a subset of the first set of neural signals is determined to be above a threshold. The threshold can be set such that a neural spike is detected as being above the threshold. After sampling each input of the plurality of inputs at the target frequency, one or more of the first set of neural signals can be above the threshold. The one or more of the first set of neural signals can be the subset of the first set of neural signals.

In operation 406, a group of the plurality of inputs corresponding to the subset of the first set of neural signals is identified. Each neural signal of the subset of the first set of neural signals can correspond to a particular input of the plurality of inputs. So, the inputs corresponding to the subset of the first set of neural signals can be identified as the group of the plurality of inputs.

In operation 408, operation of the multiplexer is modified to block inputs not in the identified group of the plurality of inputs. Modifying the operation of the multiplexer can involve activating switches for the inputs in the group of the plurality of inputs and not activating switches for the inputs not in the group of the plurality of inputs. Blocking the inputs not in the identified group of inputs can reduce a power consumption of an integrated circuit that includes the multiplexer. The switches can be activated by a second control signal of the decoder of the multiplexer.

In operation 410, the multiplexer receives a second set of neural signals via the group of the plurality of inputs. The second set of neural signals are received only for the inputs in the group of the plurality of inputs based on the modification of the operation of the multiplexer.

In operation 412, the second set of neural signals are transmitted to a plurality of channels of an amplifier while blocking inputs not in the identified group of the plurality of inputs. The amplifier may be the first amplifier 232a or the second amplifier 236a of the analog pixel 230a in FIG. 2A.

In particular, the amplifier may be a low-noise amplifier, a variable-gain amplifier, or any other suitable amplifier. Since the second set of neural signals only includes neural signals from the group of the plurality of inputs, the amplifier does not receive neural signals from inputs not in the identified group of the plurality of inputs.

In operation 414, the second set of neural signals is amplified using the amplifier. The second set of neural signals pass through the amplifier and may be re-scaled. The output of the amplifier is an amplified second set of neural signals.

In operation 416, the amplified second set of neural signals is transmitted for further processing. Transmitting the amplified second set of neural signals for further processing can involve the amplifier transmitting the amplified second set of neural signals to a band-pass filter to generate a filtered set of neural signals. The band-pass filter can then transmit the filtered set of neural signals to a second amplifiers that can amplify the filtered sets of neural signals. Transmitting the amplified second set of neural signals for further processing may also include transmitting the amplified second set of neural signals to an analog multiplexer. Additionally or alternatively, transmitting the amplified second set of neural signals for further processing may involve transmitting the second set of neural signals off of the integrated circuit, for example, via a short-range wireless communication.

It should be appreciated that a brain implant or other system and a respective control system for the brain implant can have one or more microprocessors/processing devices that can further be a component of the overall apparatuses. The control systems are generally proximate to their respective devices, in electronic communication (wired or wireless) and can also include a display interface and/or operational controls configured to be handled by a user to monitor the respective systems, to change configurations of the respective systems, and to operate, directly guide, or set programmed instructions for the respective systems, and sub-portions thereof. Such processing devices can be communicatively coupled to a non-volatile memory device via a bus. The non-volatile memory device may include any type of memory device that retains stored information when powered off. Non-limiting examples of the memory device include electrically erasable programmable read-only memory ("ROM"), flash memory, or any other type of non-volatile memory. In some aspects, at least some of the memory device can include a non-transitory medium or memory device from which the processing device can read instructions. A non-transitory computer-readable medium can include electronic, optical, magnetic, or other storage devices capable of providing the processing device with computer-readable instructions or other program code. Non-limiting examples of a non-transitory computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C #, Java, Python, Perl, JavaScript, etc.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

In some embodiments, the systems and methods of the present disclosure can be used in connection with neurosurgical techniques. However, one skilled in the art would recognize that neurosurgical techniques are a non-limiting application, and the systems and methods of the present disclosure can be used in connection with any biological tissue. Biological tissue can include, but is not limited to, the brain, muscle, liver, pancreas, spleen, kidney, bladder, intestine, heart, stomach, skin, colon, and the like.

The systems and methods of the present disclosure can be used on any suitable multicellular organism including, but not limited to, invertebrates, vertebrates, fish, bird, mammals, rodents (e.g., mice, rats), ungulates, cows, sheep, pigs, horses, non-human primates, and humans. Moreover, biological tissue can be ex vivo (e.g., tissue explant), or in vivo (e.g., the method is a surgical procedure performed on a patient).

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

What is claimed is:

1. A method comprising:
    receiving, into a multiplexer, a first set of neural signals via a plurality of inputs;

determining that a subset of the first set of neural signals is above a threshold;
identifying a group of the plurality of inputs corresponding to the subset of the first set of neural signals;
modifying operation of the multiplexer to block inputs not in the identified group of the plurality of inputs;
receiving, into the multiplexer, a second set of neural signals via the group of the plurality of inputs;
transmitting the second set of neural signals to a plurality of channels of an amplifier while blocking inputs not in the identified group of the plurality of inputs;
amplifying the second set of neural signals using the amplifier; and
transmitting the amplified second set of neural signals for further processing.

2. The method of claim 1, wherein receiving the first set of neural signals comprises:
switching on, in turn, a path to each input of the plurality of inputs; and
sampling each input at a target sampling frequency.

3. The method of claim 2, wherein:
the multiplexer comprises a number N of switches;
switching on each input path comprises activating a respective switch of the N switches; and
each switch is activated at N times the target sampling frequency.

4. The method of claim 1, wherein:
transmitting the first set of neural signals is performed in a first mode, the first mode activated via a first control signal by a decoder of the multiplexer; and
transmitting the second set of neural signals is performed in a second mode, the second mode activated via a second control signal of the decoder.

5. The method of claim 1, wherein:
the amplifier is a first amplifier; and
transmitting the second set of neural signals for further processing comprises:
transmitting the amplified second set of neural signals to a band-pass filter to generate a filtered set of neural signals; and
transmitting the filtered set of neural signals to a second amplifier.

6. The method of claim 1, wherein:
the first set of neural signals is received via a plurality of input multiplexers;
the plurality of input multiplexers transmit the second set of neural signals to a plurality of amplifiers; and
transmitting the amplified second set of neural signals for further processing comprises transmitting the amplified second set of neural signals to an analog multiplexer via the plurality of amplifiers.

7. The method of claim 6, further comprising:
transmitting output of the analog multiplexer to an analog-to-digital converter.

8. The method of claim 1, wherein neural signals above the threshold correspond to neural spikes.

9. The method of claim 1, wherein:
the multiplexer and the amplifier are comprised in an integrated circuit; and
transmitting the second set of neural signals for further processing comprises transmitting the second set of neural signals off of the integrated circuit.

10. The method of claim 9, wherein:
the second set of neural signals is transmitted off of the integrated circuit via a short-range wireless communication.

11. The method of claim 1, wherein the identified group of the plurality of inputs is a first group of the plurality of inputs, the method further comprising:
receiving, into the multiplexer, a third set of neural signals via the plurality of inputs determining that a subset of the third set of neural signals is above the threshold;
identifying a second group of the plurality of inputs corresponding to the subset of the third set of neural signals, wherein the second group of the plurality of inputs is different from the first group of the plurality of inputs;
modifying operation of the multiplexer to block inputs not in the identified second group of the plurality of inputs;
receiving a fourth set of neural signals via the second group of the plurality of inputs;
transmitting the fourth set of neural signals to a plurality of channels of an amplifier while blocking the inputs not in the identified second group of the plurality of inputs;
amplifying the fourth set of neural signals using the amplifier; and
transmitting the amplified fourth set of neural signals for further processing.

12. A system comprising:
a plurality of electrodes implanted in a brain and coupled to a multiplexer via a respective plurality of inputs;
the multiplexer, configured to:
receive a first set of neural signals via the plurality of inputs;
identify a group of the plurality of inputs corresponding to a subset of the first set of neural signals above a threshold;
modify operation of the multiplexer to block inputs not in the identified group of the plurality of inputs;
receive a second set of neural signals via the group of the plurality of inputs; and
transmit the second set of neural signals to a plurality of channels of an amplifier while blocking inputs not in the identified group of the plurality of inputs; and
the amplifier coupled to the multiplexer and configured to:
amplify the second set of neural signals; and
transmit the amplified second set of neural signals for further processing.

13. The system of claim 12, wherein:
the multiplexer and the amplifier are comprised in an integrated circuit.

14. The system of claim 13, further comprising:
a short-range wireless transmitter configured to transmit the second set of neural signals off of the integrated circuit.

15. The system of claim 12, wherein:
the amplifier is a first amplifier; and
the multiplexer is further configured to transmit the amplified second set of neural signals to a band-pass filter;
the system further comprising:
the band-pass filter configured to generate a filtered set of neural signals and transmit the filtered set of neural signals to a second amplifier; and
the second amplifier, configured to amplify the filtered set of neural signals.

16. The system of claim 12, further comprising:
a plurality of input multiplexers including the multiplexer, wherein the first set of neural signals is received via the plurality of input multiplexers and wherein the plurality of input multiplexers transmit the second set of neural signals to a plurality of amplifiers; and the plurality of amplifiers including the amplifier, wherein transmitting the amplified second set of neural signals for further processing comprises transmitting the amplified second set of neural signals to an analog multiplexer via the plurality of amplifiers.

17. The system of claim 12, wherein the neural signals above the threshold correspond to neural spikes.

18. The system of claim 12, wherein transmitting the first set of neural signals comprises:
   switching on, in turn, a path to each input of the plurality of inputs; and
   sampling each input at a target sampling frequency.

19. The system of claim 18, wherein:
   the multiplexer comprises a number N of switches;
   switching on each input path comprises activating a respective switch of the N switches; and
   each switch is activated at N times the target sampling frequency.

20. The system of claim 12, wherein:
   the identified group of the plurality of inputs is a first group of the plurality of inputs; and
   the multiplexer is further configured to:
      receive a third set of neural signals via the plurality of inputs;
      identify a second group of the plurality of inputs corresponding to a subset of the third set of neural signals above the threshold, wherein the second group of the plurality of inputs is different from the first group of the plurality of inputs;
      modify operation of the multiplexer to block inputs not in the identified second group of the plurality of inputs;
      receive a fourth set of neural signals via the second group of the plurality of inputs; and
      transmit the fourth set of neural signals to the amplifier while blocking inputs not in the identified second group of the plurality of inputs;
   the amplifier further configured to:
      amplify the fourth set of neural signals; and
      transmit the amplified fourth set of neural signals for further processing.

\* \* \* \* \*